United States Patent [19]

Reitberger

[11] 4,354,197
[45] Oct. 12, 1982

[54] INK JET PRINTER DRIVE MEANS

[75] Inventor: Peter H. Reitberger, Munich, Fed. Rep. of Germany

[73] Assignee: NCR Corporation, Dayton, Ohio

[21] Appl. No.: 193,570

[22] Filed: Oct. 3, 1980

[51] Int. Cl.³ .......................................... G01D 15/18
[52] U.S. Cl. .................................................. 346/140 R
[58] Field of Search .................................. 346/140, 75

[56] References Cited

U.S. PATENT DOCUMENTS

| | | | |
|---|---|---|---|
| 3,683,212 | 8/1972 | Zoltan | 346/140 X |
| 3,832,579 | 8/1974 | Arndt | 346/140 X |
| 4,021,818 | 5/1977 | Vloten | 346/140 |
| 4,023,180 | 5/1977 | Zenner | 346/140 X |

OTHER PUBLICATIONS

Krause, K. A.; Focusing Ink Jet Head; IBM TDB, vol. 16, No. 4, Sep. 1973, p. 1168.

Primary Examiner—Joseph W. Hartary
Attorney, Agent, or Firm—J. T. Cavender; Wilbert Hawk, Jr.; George J. Muckenthaler

[57] ABSTRACT

The ink in an ink jet printer is accelerated by means of cylindrically-shaped electromagnetically energized pressure waves wherein plates of metal serve as electrodes between which a capacitor is discharged. The capacitor along with the resistance losses and the inductance of the leads represent a damped oscillating circuit to reduce the back pressure waves. Other means of damping include a soft hose having an exponentially shaped portion, porous material in a passageway between a pair of air chambers, and a plastic foil placed between the pressure wave drive means and the nozzle.

18 Claims, 13 Drawing Figures

INK JET PRINTER DRIVE MEANS

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is well-known, the impact operation depends upon the movement of impact members such as wires or the like and which are typically moved by means of an electromechanical system which is believed to enable a more precise control of the impact members.

The advent of non-impact printing, as in the case of thermal printing, brought out the fact that the heating cycle must be controlled in a manner to obtain maximum repeated operations. Likewise, the control of ink jet printing in at least one form thereof must deal with rapid starting and stopping movement of the ink fluid from a supply of the fluid. In each case, the precise control of the thermal elements and of the ink droplets is necessary to provide for both correct and high-speed printing.

In the matter of ink jet printing, it is extremely important that the control of the ink droplets be precise and accurate from the time of formation of the droplets to the depositing of such droplets on paper or like record media. While the method of printing with ink may be performed in continuous pulse manner or in pulse on demand manner, the latter method is disclosed in the present application as applying the features of the present invention. The drive means for the ink droplets is generally in the form of a crystal element to provide the high speed operation as demanded for ejecting the ink through the nozzle while allowing time between droplets for proper operation. The time allowed between the droplets is effected by the particular means provided for damping the oscillations of the pressure waves generated during the printing operation.

It is therefore proposed to provide drive means with adequate damping of the pressure waves of the ink to maintain high speed ink jet printing.

Representative prior art in the field of drive means and damping thereof includes British Patent Application No. 2,007,162 corresponding to German Patent Application No. 2,843,064 to I. Endo et al., published on May 16, 1979, and which discloses a process whereby liquid droplets are formed by applying thermal energy to the ink in a chamber to cause a volume change in the ink and expel the ink onto a recording medium. The thermal energy may be generated by an electrothermal or a photothermal transducer.

U.S. Pat. No. 3,281,859, issued to J. J. Stone on Oct. 25, 1966, discloses apparatus for forming drops and having a magnet positioned to establish a magnetic field transversely through a portion of a tube along with a wire attached to the tube in the region of the magnetic field and means for applying current to the wire at a frequency to emit droplets of ink.

U.S. Pat. No. 3,596,275, issued to R. G. Sweet on July 27, 1971, discloses a fluid droplet recorder wherein a flow of droplets of controlled electrostatic charges are generated by continuous vibration and made to fly between deflecting electrodes forming a uniform electric field.

U.S. Pat. No. 3,747,120, issued to N. G. E. Stemme on July 17, 1973, discloses an arrangement of writing mechanisms wherein an outer chamber and an inner chamber are connected by a channel and the inner chamber is provided with a device for generating droplets on demand and signals are applied to the device in the form of a piezoelectric crystal which has an orifice to convert the signals into vibrations.

U.S. Pat. No. 4,027,308, issued to G. J. Fan et al. on May 31, 1977, discloses method and apparatus for forming droplets from a magnetic liquid stream wherein one or more magnetic fields is periodically applied to a magnetic liquid stream to create perturbations in the stream so as to form droplets therefrom with substantially uniform spacing and of uniform size.

U.S. Pat. No. 4,060,812, issued to J. Mako et al. on Nov. 29, 1977, discloses a nozzle for an ink jet printer and an electromechanical transducer is operated at a frequency for vibrating the nozzle for applying perturbations to the ink to form droplets as a result of sound waves within the body of said ink. Damper means is provided in the ink and in contact with the body of the ink within the nozzle for absorbing energy from the sound waves.

U.S. Pat. No. 4,112,433, issued to R. H. Vernon on Sept. 5, 1978, discloses a meniscus dampening drop generator wherein a first pressure increase is effected in liquid to express liquid droplets and then a time-delayed second pressure increase is effected in the same pressure chamber to effect a pressure front timed to arrive within the dampening vicinity of a droplet orifice at substantially the same instant that the droplet leaves the orifice for the purpose of dampening substantially the full period of meniscus vibration.

U.S. Pat. No. 4,115,789, issued to K. H. Fischbech on Sept. 19, 1978, discloses a piezoelectric driver and a liquid droplet instrument having an elastic diaphragm which forms an outer wall of each ink chamber. The drivers are energized to place a stress on the wall to decrease the volume of each chamber and to propel a liquid droplet therefrom.

U.S. Pat. No. 4,124,853, issued to E. Kattner et al. on Nov. 7, 1978, discloses a device for dampening hydraulic pressure fluctuations or vibrations in a cavity of an ink jet supply wherein the cavity has an elastic wall member which may be either a diaphragm closing and opening in the cavity or an elastic tube in communication with the atmosphere.

U.S. Pat. No. 4,131,899, issued to K. Christou on Dec. 26, 1978, discloses a droplet generator for an ink jet printer wherein a piezoelectric crystal actuates a flexural diaphragm that forms one wall of a chamber to create pressure perturbations that force the ink through the nozzle to form droplets and also includes means for damping oscillations of the crystal to prevent unwanted secondary generation of the droplets.

And, U.S. Pat. No. 4,167,742, issued to D. L. Head et al. on Sept. 11, 1979, discloses damping means for an ink jet printing device having means stimulating the orifice plate to cause traveling wave vibrations to induce droplets from the orifices and vibration damping means for damping out the wave vibrations in the orifice plate by means of a V-shaped cross-sectional portion extending toward the oncoming traveling waves.

SUMMARY OF THE INVENTION

The present invention relates to ink jet printing, and more particularly to drive means for producing pressure waves for ejecting ink droplets from the nozzle of an ink jet printer. The pressure waves are produced by an arrangement of electrodes which are energized in electromagnetic manner for accelerating the ink from an ink chamber in the form of cylindrically-shaped waves. After acceleration of the ink pressure waves, means is also provided for deceleration of the waves so as to greatly increase the speed of generating the ink droplets and the operation of the printer.

In a preferred arrangement of the invention, metallic plates serve as the electrodes and a capacitor circuit is connected to produce a magnetic field which generates an outwardly-directed force in the ink in the shape of a pressure wave. After generation of each pressure wave, the capacitor circuit then acts as a damped oscillating circuit to enable faster repeated operations.

Another arrangement for generating the pressure wave in a concentrated manner in the direction of the nozzle is by means of a curved formation to increase the speed of ink droplets from the nozzle of the printer.

When pressure waves are generated close to the nozzle, the return waves tend to flow into the ink supply or ink chamber and damping means is utilized to minimize the effect of the back pressure waves. Examples of damping means which may be used in the practice of the present invention include a flexible or pliant member having exponential shaping in one portion thereof, porous material placed in a chamber with air chambers on either side of the material, and the use of plastic or non-metallic foil in the ink chamber to limit the recurring pressure waves.

In view of the above discussion, the principal object of the present invention is to provide a shaped pressure wave adjacent the nozzle of an ink jet printer for accelerating ink from said nozzle in the form of ink droplets.

Another object of the present invention is to provide magnetically-energized pressure waves of ink in an ink jet printer and an associated circuit for damping the recurrent pressure waves.

An additional object of the present invention is to provide means for concentrating pressure waves close to the nozzle of an ink jet printer for generating outwardly-directed forces in the ink.

A further object of the present invention is to provide means for generation of pressure waves in the ink of an ink jet printer close to the nozzle thereof wherein the waves are formed with greater amplitude and at a high ink droplet speed along with the provision of means for damping the pressure waves which tend to flow in return manner to the ink chamber.

Additional advantages and features of the present invention will become apparent and fully understood from a reading of the following description taken together with the annexed drawing.

DETAILED DESCRIPTION OF THE INVENTION

Figure 1:
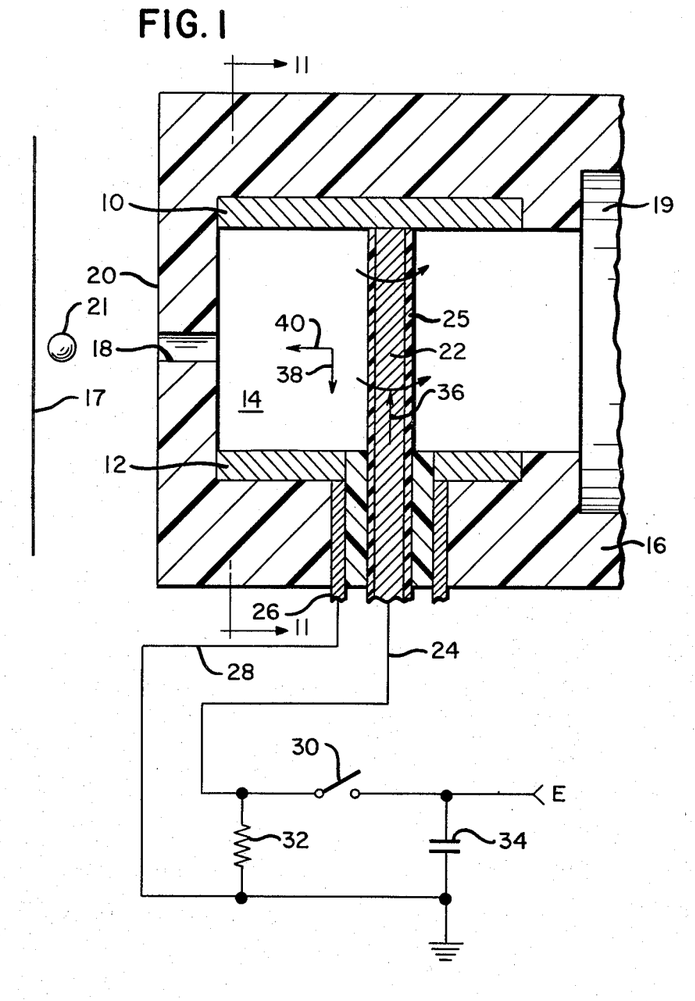
FIG. 1 is a diagrammatic view of an arrangement for generating shaped pressure waves for producing ink droplets.

FIG. 1 of the drawing shows an arrangement for producing cylindrically shaped pressure waves of ink which are electromagnetically initiated and which effect the ejection of ink droplets from an outlet of an ink jet printer. Two circular electrode plates 10 and 12 made of stainless steel and maintained in spaced relationship are disposed adjacent an ink chamber 14 which is formed in the shape of a rectangular parallelepiped or like configuration within a plastic body 16 of cylindrical shape. A nozzle 18 is provided as the outlet from the ink chamber 14 to one end 20 of the plastic body 16 for serving as the orifice through which the ink is ejected in droplet form 21 for printing on paper or other record material 17 spaced from the nozzle and as enabled by the actuation of the ink drive means. A bore or like opening 19 is provided for an ink supply line connected to the body 16 for supplying ink to the chamber 14.

A central conductor 22 of brass material and preferably circular in nature has one end connected to a lead 24 of a supply voltage E and the other end connected to the electrode plate 10. The conductor 22 is coated with a suitable plastic material 25 such as manufactured by DuPont and sold under the registered trademark "Teflon", and is also insulated from a conductor 26 of brass material having one end connected with the plate 12 and the other end connected with a lead 28 connected to ground potential.

A switching device 30 is inserted in the line 24 and an R-C circuit including a resistor 32 and a capacitor 34 are placed across the leads 24 and 28 in a manner to effect energization of the plates 10 and 12 for the purpose of obtaining a higher ejection rate of ink droplets. In this manner, the plates 10 and 12 serve as electrodes between which the charged capacitor 34 discharges upon closing the switch 30. The discharge current takes the path of least resistance which at the instant of actuation coincides with the path of least inductance. The discharge current will always actuate as a surface discharge spark along the insulated central conductor 22.

The current flowing in the direction as indicated by the arrow 36 through the central conductor 22 produces an azimuthal magnetic field (a field directed in a horizontal plane and in a clockwise direction) which, with the charged layer directed axially with the conductor 22 as indicated by the arrow 38 in the liquid ink in the chamber 14, generates a radially outwardly directed force as indicated by the arrow 40. The electrically-charged layer transmits its pulse to the ink being available in the impact wave chamber 14 and thereby produces a cylindrical-shaped pressure wave in the form of an inverse pinch effect to cause ejection of ink in droplet form from the nozzle 18.

A damped oscillating circuit is provided by the capacitor 34, the resistor 32, and the inductance which is inherent in the leads 24 and 28. Actuation of the switch 30, produces one or more pressure waves upon each closure thereof, dependent upon the resistance losses in the circuit.

Figure 2:
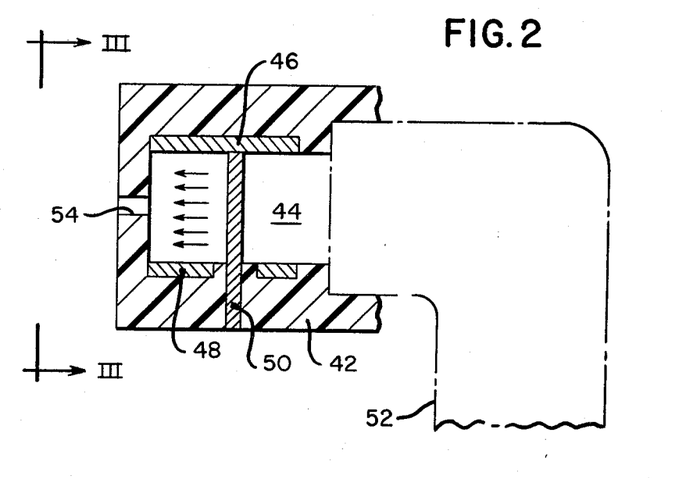
FIG. 2 is a diagrammatic view of another arrangement for generating shaped pressure waves.
Figure 3:
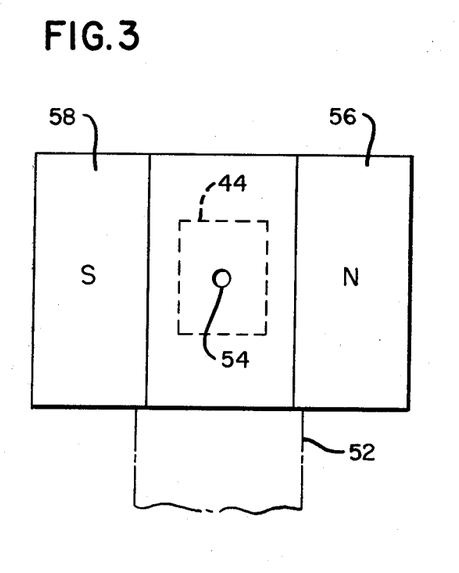
FIG. 3 is a view taken along the plane 3—3 of FIG. 2.

FIG. 2 shows another arrangement for generating directed pressure waves wherein a plastic body 42 contains an ink chamber 44 and metallic plates 46 and 48 along with a central conductor 50 for moving ink from a supply tube 52 into the chamber 44 and out through an ink nozzle 54, all in similar manner as shown in FIG. 1. Additionally, as seen in FIG. 3, a magnetic field is provided by means of permanent magnets 56 and 58, adjacent the ink cavity 44 and more specifically ferrite-type magnets, for causing a preferred direction of movement for spreading the produced pressure waves toward the nozzle 54, as shown by the arrows in FIG. 2. The magnetic effect for producing the preferred direction of movement of the ink is similar to the action of a suction pump in the manner of increasing the directed energy for ejection of the ink droplets, as 21 in FIG. 1. The arrangement, as shown in FIGS. 2 and 3, produces pressure pulses at a rate of about 50 in one microsecond. The pulse generating principle of this electrohydraulic transducer arrangement provides higher operating frequencies for the ink jet printer.

A further feature and advantage in the use of the electrohydraulic arrangement of FIGS. 1 and 2 is that the walls of the ink chambers are not geometrically changed. The central conductor 22 or discharge wire arrangement of FIG. 1 or the central conductor 50 of FIG. 2 each provides for concentration of the pressure wave in the direction of the respective nozzle 18 or 54 and thereby effects an increase in the speed of the ink droplets 21.

Figure 4:
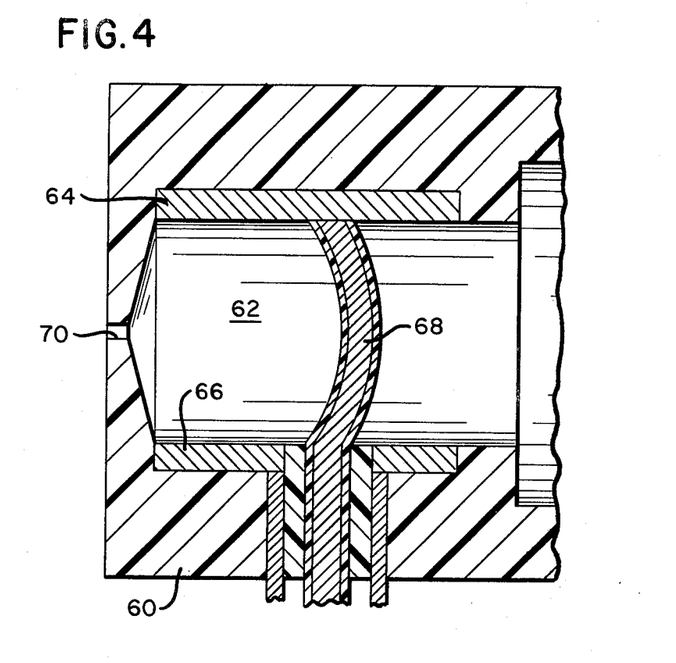
FIG. 4 is a diagrammatic view of a further arrangement for generating the shaped pressure waves.

FIG. 4 shows a pressure wave concentration arrangement by means of electrohydraulic impact wave generation for increased ink ejection. A plastic body 60 contains an ink chamber 62 and metallic plates 64 and 66 along with a central conductor 68 for moving ink from a suitable supply tube into the chamber 62 and through an ink nozzle 70, all in similar manner as seen in FIGS. 1 and 2. In this arrangement the central conductor 68 is formed in concave shape with respect to the nozzle 70 and provides a pressure wave concentrator effect as an electromagnetic and hydrodynamic transducing device to form and eject the ink droplets, as 21 in FIG. 1.

It should readily be seen that since the pressure wave generation means of the present invention provides for pressure waves near the nozzle of the print head, the geometry of the ink chamber tends to enable pressure waves to return or flow back into the ink supply means. It is desirable that the return pressure waves be of minimum amplitude and therefore the effect of these return or recurrent pressure waves is substantially diminished or almost eliminated by damping means which may take the shape and form of several arrangements.

Figure 5:
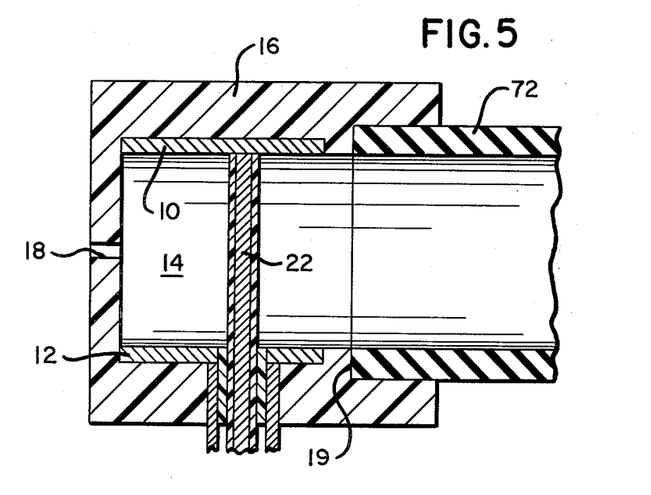
FIG. 5 is a diagrammatic view of an arrangement similar to FIG. 1 along with a portion of a flexible or pliable hose for damping the pressure waves.

FIG. 5 shows the plactic body 16 of FIG. 1 containing the plates 10 and 12 along with the central conductor 22 in the ink chamber 14 for ejecting ink droplets 21 from the nozzle 18. A hose 72 of soft wall material is connected into the bore 19 of the plastic body 16 for damping the recurrent pressure waves of the electrohydraulic pressure wave generator.

Figure 6:
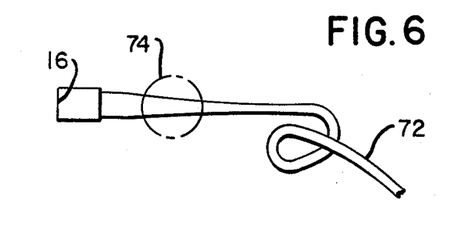
FIG. 6 is a view showing the extended form of the pliable hose partially shown in FIG. 5.

FIG. 6 shows the hose 72 which has a wall thickness of about 10 micrometers connected to the plastic body 16 of the print head and shaped to include a section 74 in exponential form. The section 74 of exponential form is located in the supply line near the print head and provides pressure wave sump means for damping the returning pressure waves in the ink chamber 14 of FIG. 1.

Figure 7:
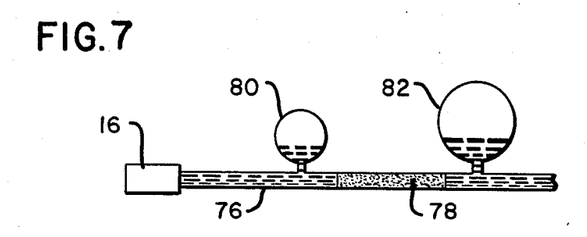
FIG. 7 is a view showing another form of damping arrangement.

FIG. 7 shows another arrangement for damping or absorbing the recurrent pressure waves which are inherent in the operation of the drive means for the ink droplets. An ink carrying conduit or passageway 76 is connected to the plastic body 16 of the print head and includes a portion 78 having porous material; for example, clay, inserted in the conduit between a pair of air chambers 80 and 82. The geometric connections of the air chambers 80 and 82 and the hydraulic resistance to the flow of ink determine the damping effect required on the recurrent or back flow of the pressure waves.

Figure 8:
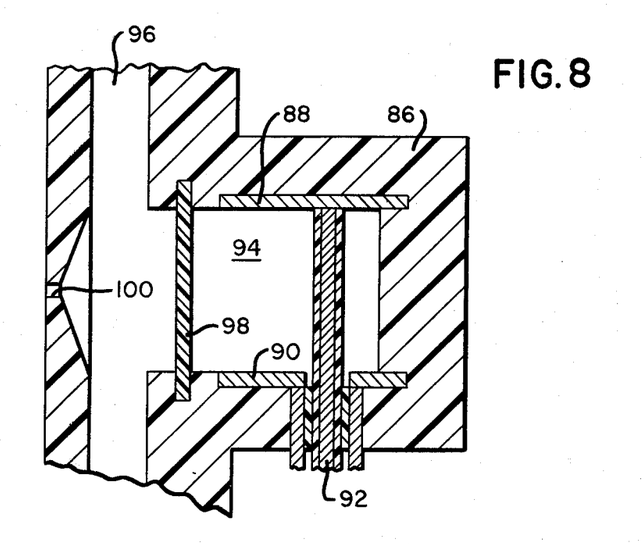
FIG. 8 is a view showing a further form of damping arrangement.

FIG. 8 shows a further arrangement of the damping apparatus for the recurrent pressure waves and includes a plastic body 86 containing plates 88 and 90 along with a central conductor 92 arranged in similar manner as shown in FIGS. 1, 2, 4 and 5. The plastic body 86 has a fluid chamber 94 therein and an ink chamber 96 at right angles to chamber 94 and separated by a plastic member 98. A nozzle 100 is provided in a wall of the plastic body 86 opposite the chamber 94 and the member 98. The chamber 96 is filled with ink and the chamber 94 contains oil or like viscous fluid to limit the recurring pressure waves upon actuation of the transducing means. The amount of damping and the oscillating behavior of the volume of the chamber 94 in relation to the plastic member 98 can be adjusted or changed by the choice of material used for member 98 and the type of viscous fluid placed in chamber 94. Certain chemical additives can be added to the viscous liquid to provide a gaseous atmosphere in the chamber 94. Additionally, certain liquids, such as alcohol, can be added in the damping fluid to influence the effectiveness of the damping system.

Figure 9:
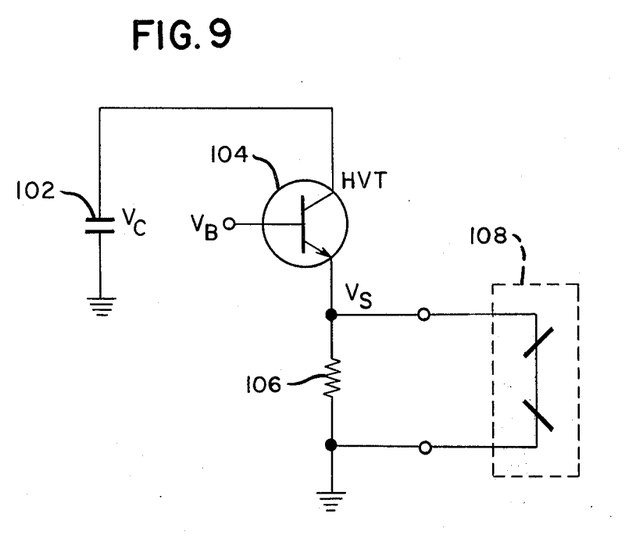
FIG. 9 is a diagram showing an alternate method of enabling the ink droplet drive means.

FIG. 9 shows a different circuit arrangement for enabling the ink droplet drive means and which includes a capacitor 102 along with a transistor or like semiconductor switch 104 and a resistor 106. The discharge path of the ink droplets is diagrammatically shown in the form of a print head 108.

Figure 10:
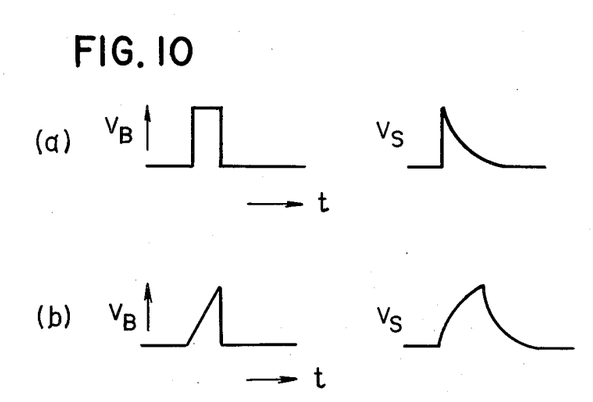
FIG. 10 is a timing diagram in graphic form of the input/output signals of the switching means of the invention.

The transistor 104 may be utilized in a manner to provide signals as indicated in graphic form of the FIG. 10 timing diagram with a time parameter t to derive optimum separation of the ink droplets. $V_S$ is a function of $V_B$ and $V_C$, the latter being the potential across the capacitor 102 in FIG. 9. In the upper timing diagram (a), if the input voltage $V_B$ of the transistor 104 (FIG. 9) is a square-wave impulse signal, then the discharge function of the capacitance is like that of the voltage $V_S$ of the timing diagram (a). In the lower timing diagram (b), if the voltage $V_B$ of the transistor 104 (FIG. 9) is a peak-shaped impulse signal, then the discharge function is like that of the voltage $V_S$ of the timing diagram (b), therefore making it possible to modify the output voltage $V_S$ of such transistor 104 (FIG. 9). In the latter case (b), $V_S$ results from the superposition of $V_B$ and $V_C$ in the manner wherein $V_B$ determines the rise and $V_C$ determines the decline of $V_S$.

Figure 11:
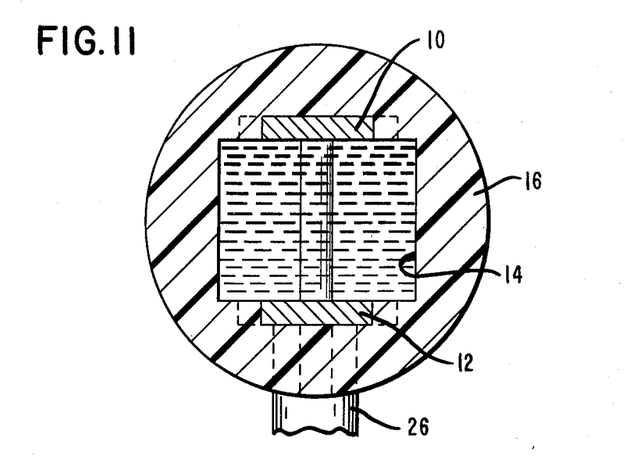
FIG. 11 is a view taken along the line 11—11 of FIG. 1.

FIG. 11 is a sectional view of the FIG. 1 arrangement showing the electrode plates 10 and 12 adjacent the ink chamber 14 formed within the plastic body 16 and also showing the conductor 26.

Figure 12:
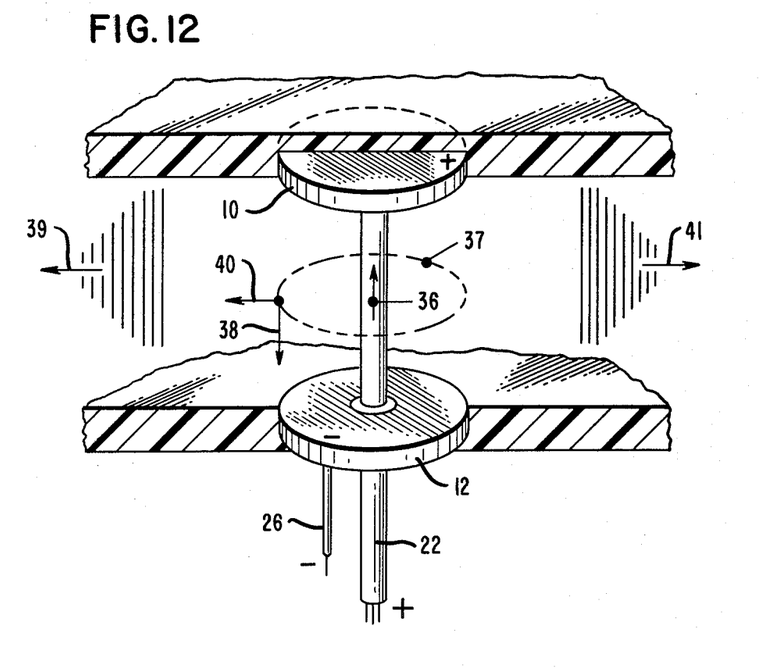
FIG. 12 is a sectional view showing the electrodes and the operation of the magnetic field and the forces interacting in the ink.

FIG. 12 shows the electrode plates 10 and 12 along with the operation of the electric and magnetic fields and the forces acting on the ink fluid. The illustration in FIG. 12 further clarifies the arrangement of FIG. 1 and includes the current flow direction 36 in the conductor 22 along with the charged ink layer directed axially with respect to such conductor, as shown by the arrow 38, and the radially outwardly directed force relative to such conductor, as indicated by the arrow 40. Additionally, the azimuthal magnetic field defined as the field directed in a horizontal plane and in a clockwise direction, mentioned hereinabove, of the current represented by arrow 36, is shown by the circle 37 to agree with the arrows relative to conductor 22 in FIG. 1. The current through the conductor 22 is the charging current of the capacitor consisting of the electrodes 10 and 12. The vector representing the outer current layer 38 of the dielectric displacement current is combined with the azimuthal magnetic field to form the Lorentz force 40. The arrow 39 and the arrow 41 represent pressure waves generated in the ink fluid by the force 40 and is a result of the discharge current and the magnetic field produced around the conductor 22.

Figure 13:
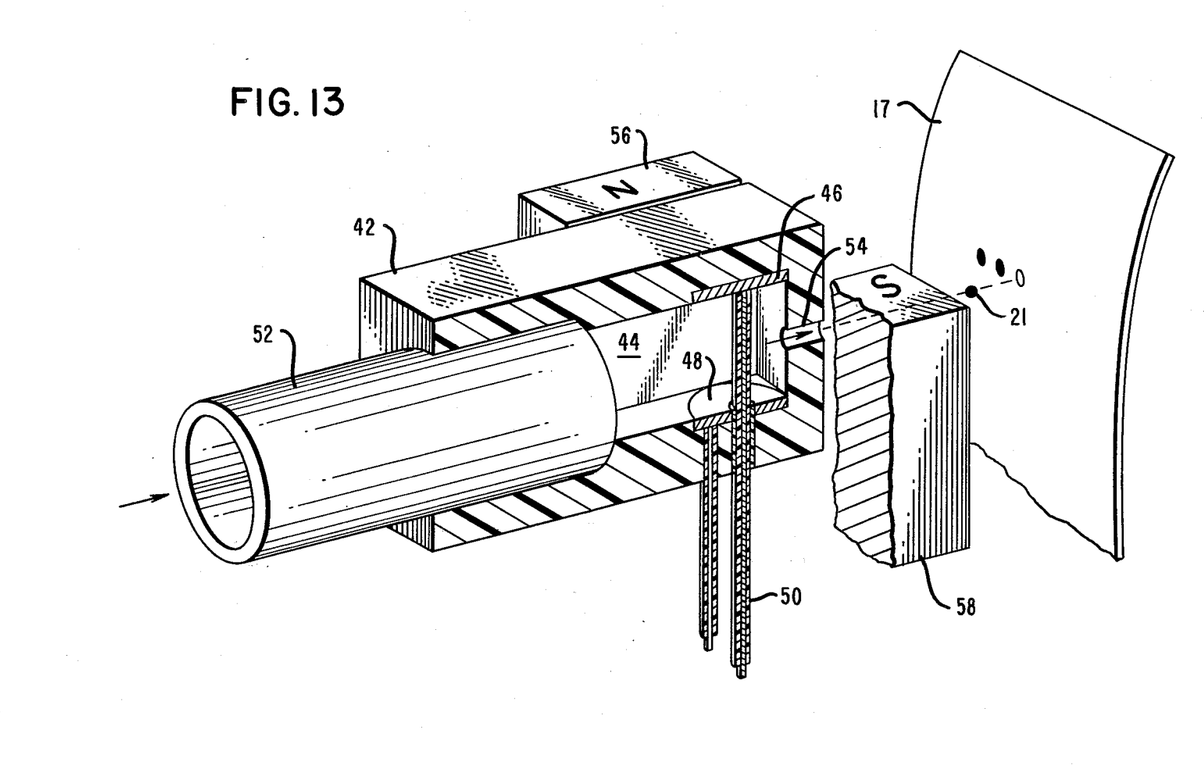
FIG. 13 is a perspective view, partly in section, showing the structure of FIGS. 2 and 3 at a different angle.

The structure of the present invention is shown in FIG. 13 from a different viewing angle wherein the plastic body 42 is formed to receive the supply tube 52 for providing ink to the chamber 44. The circular electrode plates 46 and 48 are contained adjacent the chamber 44 and plate 46 has conductor 50 connected thereto and plate 48 has a conductor connected thereto in similar manner as conductor 26 in FIG. 1. The body 42 contains the nozzle 54 through which ink is formed in droplets 21 and which are caused to be deposited on the paper 17, as also seen in FIG. 1. The permanent magnets 56 and 58 provide a magnetic field for causing the preferred direction of movement of the pressure waves in the ink.

It is thus seen that herein shown and described is ink droplet generation means wherein plates serve as electrodes between which a capacitor is discharged to provide pressure waves of ink. Damping means is also provided for the recurrent pressure waves to increase the frequency of pulses in the ink jet printing operation. The apparatus of the present invention enables the accomplishment of the objects and advantages mentioned above and, while a preferred embodiment and several modifications thereof have been disclosed herein, other variations may occur to those skilled in the art. It is contemplated that all such modifications and variations not departing from the spirit and scope of the invention hereof are to be constructed in accordance with the following claims.

I claim:

1. Apparatus for producing characters on record media in dot matrix form comprising a body portion having an inlet, an ink chamber within said body portion and containing fluid under pressure, a pair of metallic electrodes adjacent said chamber and spaced to accommodate said fluid therebetween, an outlet of said body portion forming an aperture of reduced diameter from that of said inlet, electrical conducting means extending through said chamber and connected with one of said electrodes for receiving current and insulated from the other electrode and producing an azimuthal magnetic field in said fluid for generating a force in the direction of said aperture, and means connected with said electrical conducting means and with the other electrode for switching operation of said conducting means whereby discharge of current between said electrodes in said magnetic field is transmitted to the ink fluid for producing pressure waves therein and causing ejection of ink from the aperture in droplet form.

2. The apparatus of claim 1 wherein said body portion outlet comprises a nozzle of cylindrical form for ejecting ink droplets from said chamber.

3. The apparatus of claim 1 wherein the electrical conducting means comprises a central conductor disposed transversely through said ink chamber for producing pressure waves radially from said conductor and toward said aperture.

4. The apparatus of claim 1 wherein said switching means comprises a switch in series with a capacitor for high speed intermittent generation of pressure waves within said ink chamber.

5. The apparatus of claim 1 including permanent magnets disposed adjacent the ink chamber for producing pressure waves of ink in the direction of the aperture.

6. The apparatus of claim 1 wherein the electrical conducting means comprises a metallic conductor having an insulating coating thereon and disposed through said ink chamber perpendicular to the axis of the aperture.

7. The apparatus of claim 1 wherein the electrical conducting means comprises a metallic conductor formed in concave shape with respect to the aperture.

8. The apparatus of claim 1 including circuit means comprising a capacitor and a resistor connected for oscillation in damping pressure waves generated in the ink chamber.

9. The apparatus of claim 1 including resilient means connected to the inlet of said ink chamber for damping pressure waves recurrent from pressure waves generated in the direction of said aperture.

10. An ink jet printer comprising a body portion, an ink chamber formed within said body portion and containing fluid under pressure, means for supplying ink into said ink chamber, a nozzle in said body portion communicating with said ink chamber and disposed for ejecting droplets of ink on record media spaced therefrom, metallic means comprising a pair of electrodes adjacent said ink chamber and spaced to accommodate said fluid therebetween, electrical conducting means positioned in and extending through said chamber and connected with one of said electrodes for receiving current and insulated from the other electrode and producing an azimuthal magnetic field in said fluid for generating a force in a predetermined direction, and means connected with said electrical conducting means for intermittent actuation thereof and with the other electrode whereby discharge of current between said electrodes in said magnetic field is transmitted to the ink fluid for producing pressure waves to cause ejection of ink in droplet form from said nozzle.

11. The printer of claim 10 wherein the electrical conducting means comprises a central conductor directed transversely through said ink chamber for producing pressure waves radially from said conductor and toward said nozzle.

12. The printer of claim 10 wherein said actuation means comprises a capacitor in series with a switch for high speed generation of pressure waves within said ink chamber.

13. The printer of claim 10 including permanent magnets disposed adjacent the ink chamber for producing pressure waves of ink in the direction of the nozzle.

14. The printer of claim 10 wherein the electrical conducting means comprises a metallic conductor formed in concave shape with respect to the nozzle.

15. The printer of claim 10 including circuit means comprising a resistor and a capacitor connected for oscillation in damping pressure waves recurrent in the ink chamber.

16. The printer of claim 10 including resilient means connected to the ink supply means for damping pressure waves recurrent from pressure waves generated in the direction of the nozzle.

17. The printer of claim 10 including a passageway connected to the ink supply means and having a portion of porous material in said passageway for damping recurrent pressure waves.

18. The printer of claim 10 including a fluid chamber and a wall member separating the fluid chamber from the ink chamber, the wall member limiting the recurring pressure waves upon actuation of the electrical conducting means.

* * * * *